Oct. 20, 1959 H. L. HUMES, JR., ET AL 2,909,765

RADIANT ENERGY RESPONSIVE COMMUNICATIONS SYSTEM

Filed Dec. 23, 1955 3 Sheets-Sheet 1

INVENTOR
HAROLD L. HUMES, JR.
GERALD C. RANDOLPH

BY George H. Corey

ATTORNEY

Oct. 20, 1959 H. L. HUMES, JR., ET AL 2,909,765

RADIANT ENERGY RESPONSIVE COMMUNICATIONS SYSTEM

Filed Dec. 23, 1955 3 Sheets-Sheet 2

INVENTOR

HAROLD L. HUMES, JR.
GERALD C. RANDOLPH

BY George H. Corey

ATTORNEY

RADIANT ENERGY RESPONSIVE COMMUNICATIONS SYSTEM

Filed Dec. 23, 1955 3 Sheets-Sheet 3

INVENTOR
HAROLD L. HUMES, JR.
GERALD C. RANDOLPH

BY George H. Corey
ATTORNEY

United States Patent Office 2,909,765

Patented Oct. 20, 1959

2,909,765

RADIANT ENERGY RESPONSIVE COMMUNICATIONS SYSTEM

Harold L. Humes, Jr., and Gerald C. Randolph, New York, N.Y.

Application December 23, 1955, Serial No. 555,101

11 Claims. (Cl. 340—221)

Figure 1A:
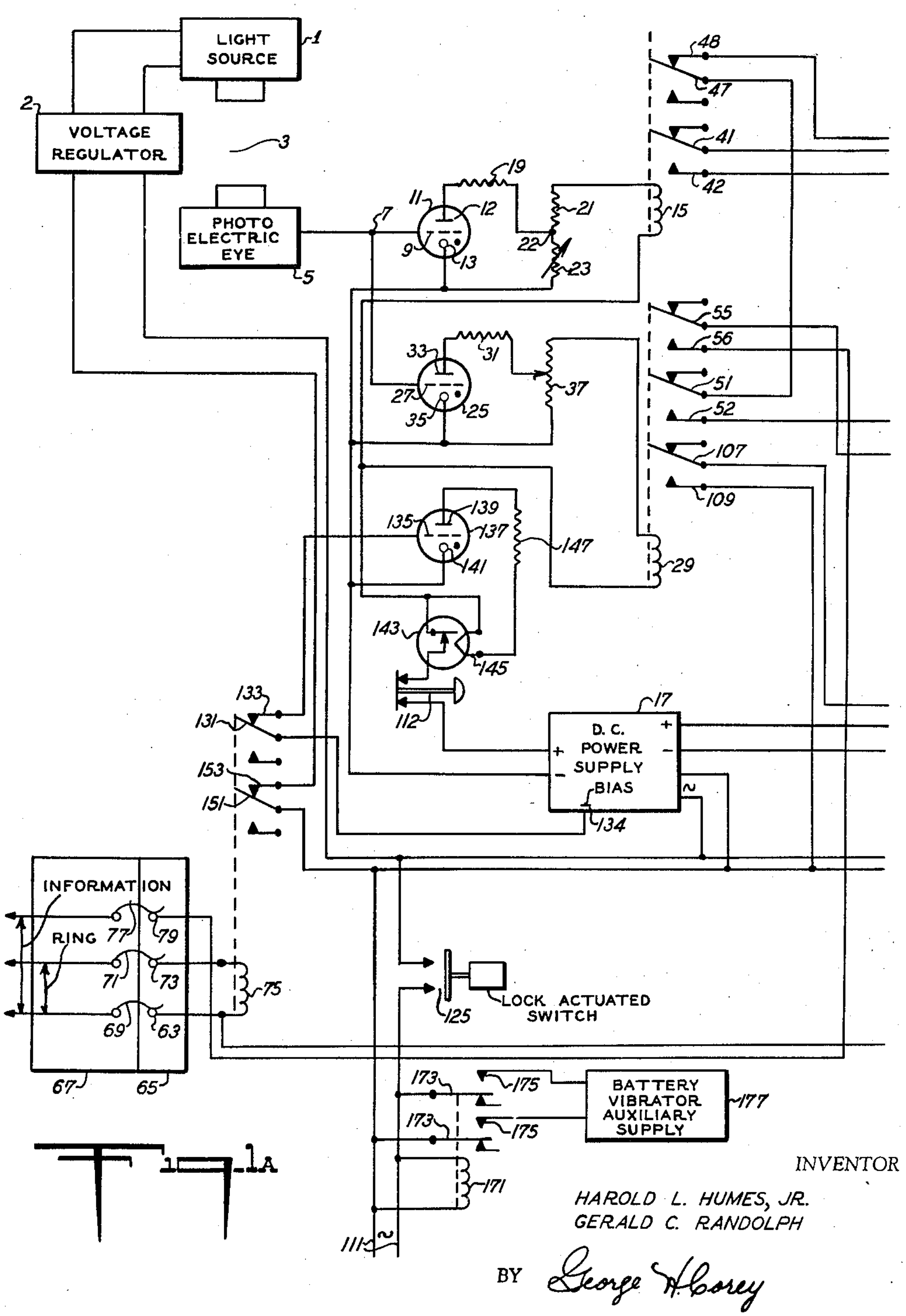

This invention relates to communications systems and more specially to alarm signaling systems. The invention particularly relates to systems for detecting and signaling the presence of an intruder or the occurrence of fire producing smoke.

Systems for producing an alarm signal in response to the presence of an intruder in a predetermined space, such as a room, heretofore have been proposed. Various devices and systems also have been proposed for signaling the occurrence of fire, these systems ordinarily being actuated by a thermal device. Such systems for detecting and signaling the presence of an intruder or the occurrence of fire have provided for transmission of the signal to a remotely disposed station, such as the watchman's station or the police station. Such transmission has been accomplished electrically.

It is an object of the invention to provide a system in which either the presence of an intruder or the existence of fire or smoke may be detected and a corresponding signal transmitted to a distant station.

It is another object of the invention to provide a system which is operated by a detecting device capable selectively of responding to the presence of an intruder or to the existence of fire, particularly of smoke.

It is a further object of the invention to provide a system in which signals are transmitted indicating the presence of an intruder or the existence of fire or smoke through a conventional telephone system to a selected station, such as the police station.

It is a still further object of the invention to provide a system in which spoken messages informing of the presence of an intruder or the existence of fire are transmitted to a distant station over a telephone system.

It is an additional object of the invention to provide a system for transmission of a signal indicating the presence of an intruder or the existence of fire or smoke over a telephone system in which the distant station is automatically called and the corresponding message then automatically transmitted.

It is another object of the invention to provide a simplified system and simplified means for combined control of the calling of a distant station and of the transmission of a signal or a message, the calling being effected in a predetermined time relation to transmission of the signal or message.

While in one aspect thereof the invention relates broadly to a communications system in which a signal is transmitted in response to a given condition, such as the presence of an intruder or the existence of fire, to a receptor means capable of producing indications of these conditions, the invention will be described more particularly in connection with the transmission of voice messages over a telephone system to a distant station, the calling of this station being effected automatically upon actuation of a detecting means in response to the presence of the intruder or of smoke in the atmosphere of a predetermined space, such as a room.

It is a feature of the invention with respect to a communications system that detecting means are provided which utilize a beam of radiant energy projected across a space. The system also provides a plurality of control means connected to this detecting means and responsive to variations in the radiant energy of the beam. These control means, respectively, are so adjusted and so connected through transmission means to receptor means that the presence of an intruder moving into and interrupting the radiant energy beam, on the one hand, is transmitted to the receptor means to produce therein indication of such presence, and the presence of smoke or other more or less translucent medium, which reduces but does not completely interrupt the radiant energy of the beam, is transmitted to the receptor means to produce therein a different indication, that is, the presence of such medium in the space.

Another feature of the invention relates to a device for recording information to be transmitted in response to the operation of detecting means, for example, means for detecting the presence of an intruder or the presence of smoke, this device providing also means for controlling the transmission in such a manner as to provide, upon operation of the detecting means, for calling a distant station to which the recorded information is to be transmitted. More specifically in this feature the device carries the recorded information in a track capable of being moved lengthwise of the track with respect to pick-up means for effecting electrical transmission of the recorded information, this recording device also carrying means for controlling the electrical transmission circuit so as to accomplish the calling of a distant station by an operation corresponding to dialing in a conventional telephone system.

This device is so constructed as to be capable of cooperating with a switching device of particular form which is part of the invention, so as to provide sharply defined closing and opening of the transmission circuit and, therefore, precise timing in order to be capable of operation in connection with a conventional telephone system and to actuate the calling elements of the distant station in the same manner as is effected by the usual dialing operation.

Other features and objects of the invention will be disclosed in connection with the embodiments shown in the drawings and about to be described in which:

Fig. 1, consisting of Parts 1*a* and 1*b*, is a diagram of a communications system utilizing electrical control means and transmission circuits and electrical devices connected between the detecting means and the receptor means.

Figure 2:
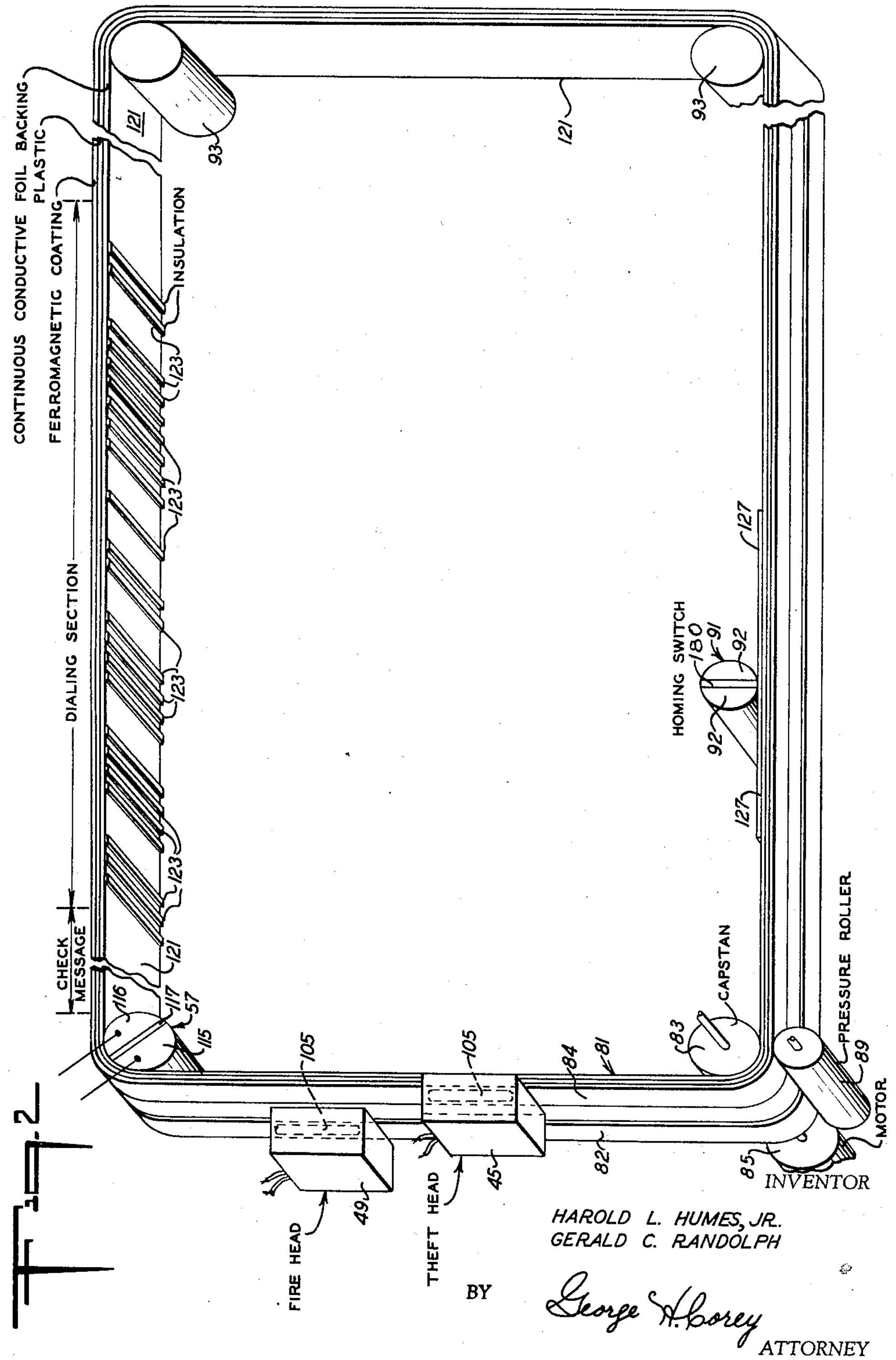

Fig. 2 shows in perspective a tape which may be used in the system of the invention, this tape providing means carrying the recorded message as well as means for effecting calling by dialing in a telephone system to which the communication system of the invention is connected.

In the system shown in Fig. 1, by way of example, a light source 1 is indicated as a source of radiant energy. While for some purposes this light source may be one which produces so-called visible light, within the scope of the invention this light source may be one which produces invisible rays, such as infra-red rays or ultra-violet rays. For the purposes of the specific embodiment being described relating to the detection of intruders, as well as of fire accompanied by smoke, a source of radiant energy producing ultra-violet rays is preferred.

Across a space 3, which in Fig. 1 diagrammatically represents any desired space, a beam of radiant energy from the source 1 is directed toward a photo-electric device, such as a photo-electric cell 5, having an element responsive to the radiant energy and capable of developing an electrical potential. Although for simplicity of illustration the distance across the space 3 between the light source and the photo-electric cell is small, within the scope of the invention the photo-electric cell 5 may be placed at any suitable distance from the radiant energy source 1. Preferably in a room or similar space within a building, in order to provide a large number of beams directed across this space so that an intruder cannot enter the space without intercepting at least one of these beams, the photo-electric cell may be placed in such a position relative to the source 1 and with respect to the direction of the beam proceeding from the source that mirrors may be disposed so as to reflect the initial beam and so that, if desired, this reflected beam again is reflected in a plurality of reflections in series until it falls upon the photo-electric cell, these reflected beams crossing and recrossing the space sufficiently to insure interruption of the beam of radiant energy proceeding from the source to the photo-electric cell when an intruder enters any part of the space or room.

In order to detect such intrusion the terminal 7 of the photo-electric cell 5 at which the electric potential developed by the radiant energy falling on the cell is produced is connected to the grid 9 of a gas filled triode 11. The circuit across the anode 12 and the cathode 13 of this triode is connected through a coil 15 of a relay to the terminals of a direct current power supply 17. In series with the triode 11 and the relay coil 15 a fixed resistor 19 is connected for limiting the anode-cathode current. In this circuit also in series with the coil 15 and the triode 11 a fixed resistor 21 is connected. A variable resistor 23 also is connected to the common terminal of the resistors 19, 21 and to the cathode terminal of the triode 11 in order to produce a regulated flow of leakage current through the resistors 21, 23, thereby to determine the potential across the anode-cathode of the triode 25. This predetermined potential across the anode and cathode of the triode 11 may be of relatively low value with respect to the potential supplied by the direct current supply 17.

Connected in parallel with the triode 11 across the supply lines from the direct current power supply 17 is a second triode 25. The grid 27 of this triode is connected in parallel with the grid 9 of the triode 11 to the terminal 7 of the photo-electric cell 5. The coil 29 of a second relay is connected in series with a fixed resistor 31 and in series with the anode-cathode of the triode 25. In order to determine the potential difference between the anode 33 and the cathode 35 of the triode 25, a variable resistor 37 is connected with a portion in parallel with the triode 25 and resistor 31 in series therewith. The resistivity of the resistors 31 and 37 may be such relative to the resistivity of the resistors 19, 21, 23 that a greater potential difference is secured across the anode-cathode of the triode 25 than across the anode-cathode of the triode 11.

It will be apparent that by adjusting the variable resistors 23, 37 to secure different potential differences between the anode and cathode of the two triodes 11, 25 different break down or "firing" potentials of the triodes are determined, that is, different potentials to which the grid potential must fall in the respective triodes in order to permit flow of current across the gas filled space of the triode between the anode and the cathode. Thus, when the radiant energy beam passing across the space 3 is completely interrupted, as by interception by an intruder, the potential on the grid 9 quickly falls to zero. If the resistivities of resistors 19, 21 and 23 are such that the potential applied across the anode 12 and the cathode 13, for example, is 50 volts, and with sufficient potential maintained at the grids to prevent "firing," the triode being assumed to have a characteristic such that it will break down or "fire" when the grid potential drops to 5 volts, the relay 15 will be energized upon "firing" of the tube concomitantly with such drop of the grid potential. As hereinafter described, this relay 15 when energized actuates contacts for control of electrical circuits to produce the desired transmission of a signal to a receptor, this signal corresponding to the interruption of the radiant energy beam by the intruder.

If the resistivities of the resistors 31 and 37 are such that the potential applied across the anode 33 and the cathode 35 is 100 volts, the characteristic of the tube 25 being such that when the potential on the grid is reduced to 10 volts the triode 25 will break down or "fire," then the relay 29 will be energized in response to such reduction in the potential applied to the grids 9, 27 by the photo-electric cell. Thus, if the radiant energy of the beam is reduced, for example, by the interference of smoke spreading through the space 3, which space, as above mentioned, may be of substantial size and filled with a plurality of radiant energy beams by reflection in succession from mirrors as the beam proceeds from the light source to the photo-electric cell, then a small reduction in the radiant energy falling on the photo-electric cell producing a relatively small reduction in the potential applied to the grids nevertheless can be effective to cause the triode 25 to "fire" to energize the relay 29 for the purpose of effecting transmission of a signal indicating the presence of smoke within the space 3. It will be understood from the description given that, if an intruder completely interrupts the beam, the potential on the grid 27 also will fall to zero and the relay 29 will be energized in addition to the relay 15.

As shown in Fig. 1 the relay 15 is provided with a plurality of contacts, some of which are back contacts and others are front contacts in order to maintain certain circuits open and other circuits closed at the contacts of the relay 15. The contact 41 is open against a back contact and is closed upon energization of the relay coil 15 against a front contact 42. Contacts 41, 42 control the circuit through an amplifier 43 to a head 45 designated in Fig. 1 as a theft head which is a pick-up device for transmitting a signal corresponding to complete interruption of the beam by an intruder. The operation of this head will be described hereinafter. The contact 47 is closed in the de-energized condition of the relay 15 against the back contact 48 and is opened against a front contact upon energization of the relay 15. Contacts 47, 48 control a circuit connected through the amplifier 43 to a fire head 49 which is a pick-up device for transmitting a signal corresponding to reduction of the radiant energy of the beam without complete interruption thereof. The operation of this fire head will be further described. The circuit controlled by the contacts 47, 48 also is connected through the normally open contacts 51, 52 actuated by the relay 29. These contacts are closed upon energization of relay 29 in response to the partial reduction of the beam energy effective to fire the triode 25. It will be understood that when an intruder interrupts the radiant energy beam to energize the relay 15 the contacts 47, 48 thereby will be opened, so that the circuit to the fire head 49 will be interrupted even though, as above explained, the relay 29 also will be energized and the contacts 51, 52 thereby closed. When, however, in the presence of smoke the radiant energy beam is reduced but not completely interrupted and only the relay 29 thereby is energized, contacts 51, 52 will be closed, the contacts 47, 48 remaining closed and the fire head will be connected through the amplifier 43.

Contact 55 normally open against the back contact is closed against front contact 56 upon energization of the relay 29. The contacts 55, 56 are connected in circuit through a split post switch 57 and through the secondary 59 of an output transformer the primary 61 of which is connected to the output terminals of the amplifier 43. This circuit through a secondary 59 of the transformer is connected to a contact 63 of a plug 65 adapted to be plugged into a jack 67 having a contact 69 connected to the common return circuit of a telephone system, the contact 63 engaging the contact 69 when the plug is inserted in the jack. Another contact 71 in the jack 67 is connected to the other side of the ringing circuit and engages contact 73 carried by the plug. A relay coil 75 is connected across the contacts 63, 73 for purposes hereinafter described.

Jack 67 also carries a contact 77 connected to the information circuit of the telephone system, this contact 77 engaging the contact 79 carried by the plug 65. The contact 79 is connected to the contact 56. Upon energization of relay 29 to close contact 55 with the contact 56 the output terminals of the transformer are connected through the contacts 63, 79 of the plug 65 to the information circuit contacts 69, 77 of the telephone system.

This telephone system may be of any suitable construction arranged for connecting the communications apparatus shown in Fig. 1 to receptor means in a distant station. Within the scope of the invention, however, the three contacts 69, 71, 77 may be connected to corresponding lines in a public telephone system. The distant station to which the message is to be transmitted may be any selected station of the telephone system, preferably for alarm purposes that of a public agency such as the police station or the fire station, or both. The message to be transmitted to such a telephone system may be transmitted through the pick-up devices, specifically the theft head 45 and the fire head 49, these pick-up devices being energized in the manner about to be described for transmitting the message through the circuit controlled by the contacts 55, 56 to the contacts of the plug 65 and of the jack 67.

For some cases another set of contacts actuated by the relay 15 may be provided, these contacts being connected in parallel with the contacts 55, 56 to close the transmission circuit to the contacts 63, 79 of the plug 65 when the theft triode breaks down or "fires." In the apparatus shown in Fig. 1, because the grids 9, 27 of the triodes 11, 25 are connected in parallel to the photo-electric cell and both these triodes break down or "fire" when the beam is completely interrupted by an intruder as above described, the requisite closing of the transmission circuit to the receptor telephone system through the jack and plug 65, 67 is secured by the closing of contacts 55, 56 actuated by the relay coil 29. It will be understood, although both triodes "fire" when the beam is completely interrupted by an intruder, that only the circuit through the theft head will be completed by the closing of the contacts 41, 42 since the contacts 47, 48 will be opened by the relay 15 simultaneously with closing of the contacts 51, 52 by the relay 29 in the circuit connected to the fire head. Thus, upon interruption of the beam by an intruder, only the theft head will be connected to the amplifier so as to transmit thereto a corresponding message. When, however, only the triode 25 breaks down on the occurrence of smoke in space 3, only the fire head 49 will be connected to the amplifier for transmitting thereto a message corresponding to such smoke condition.

The theft head 45 and the fire head 49 are disposed in the embodiment disclosed in Fig. 1 adjacent a face of an endless tape 81 supported for movement of the tape lengthwise thereof over the circumferential surface of the split post switch 57 and in engagement with the cylindrical surface of a rotatable capstan 83 driven by a motor 85 connected thereto by a shaft 87. To secure sufficient frictional engagement of the tape 81 with the capstan 83, a presser roll 89 is provided supported by means not shown to press the roll against the opposite face of the tape to that which engages the capstan 83. The tape 81 also passes circumferentially about a "homing switch" 91 and about idler rolls or posts 93 to dispose the tape in loops and to provide the requisite length of tape for the message and the number of desired repetitions of this message, as well as to maintain the stretches of the tape taut and straight, particularly the stretch adjacent which the fire head 45 and theft head 49 are disposed.

The tape 81, as shown in Figs. 1 and 2, carries two parallel tracks adjacent the respective edges of the tape and at the outer face thereof respectively in alignment with the fire and theft heads. These tracks 82 and 84 respectively constitute fire and theft message records and within the scope of the invention may be of any conventional type, such as a groove for actuating a needle pick-up. Preferably, however, the two tracks are provided by a ferro-magnetic material, such as a red or black iron oxide coating applied to the outer face of the tape 81 in parallel strips, this coating being capable of being magnetized to record a voice message. The theft track 84 in the embodiment being described is magnetized to record a voice message indicating that an intruder has entered the space 3 and complete interruption of the radiant energy beam has occurred with the resultant connection of the theft head in the circuit to the amplifier and the connection of the output terminals of the transformer to the information circuit of the telephone system. The fire track 82, made with a similar coating, is magnetized to record a voice message indicating that the radiant energy of the beam has been reduced as by the presence of smoke resulting from fire with the resultant connection of the fire head 49 in the circuit of the amplifier and the connection of the output terminals of the transformer to the information circuit of the telephone system.

The theft and fire heads 45, 49 may be of conventional construction providing a coil surrounding an iron core 105 which may be of generally rectangular shape and disposed, as shown in Figs. 1 and 2, in register with the corresponding tracks 84 and 82 on the tape 81. Thus, when the tape driven by the motor capstan 83 is moved lengthwise thereof relative to the fire and theft heads, the corresponding head will be energized due to the variations of the magnetic flux of the corresponding track, thereby to energize the amplifier 43 and to effect the transmission of the corresponding message to the information circuit of the telephone system.

The relay 29 is provided with a further set of contacts 107, 109. The contact 107 normally is open against the back contact and is closed against front contact 109 upon energization of the relay 29 to close a circuit to the motor 85 connected to the alternating current power supply line 111. It will be understood, since either for the condition of complete interruption of the beam or for the reduction of the radiant energy thereof, as by smoke, the relay 29 is energized, that for either condition the circuit is closed at the contacts 107, 109 to energize the motor and effect movement of the tape 81. Since it is a characteristic of a cold cathode triode, or of a thyratron, which may be used for the triodes 11, 25, that after breakdown or "firing" it continues to carry through the anode-cathode circuit a current limited only by the resistors in series in this circuit, the relays 15, 29 will remain energized and the circuit will be maintained, as described, the motor continuing to drive the tape until the anode-cathode circuit is opened by hand operation of the reset switch 112 or automatically by means hereinafter described.

If the beam from the light source becomes interrupted by an intruder, or if smoke or other material pervading the space 3 reduces the radiant energy of the beam, the apparatus will continue to operate and transmit the corresponding message whether or not the intruder moves out of any position in which he has interrupted the beam or whether or not the smoke afterwards clears away. The length of the respective tracks along the tape may be such as to provide for repeating the message to the distant station of the receptor or telephone system for a sufficient length of time for this message to be heard when the distant station answers after being called in the manner now to be described.

In order to call the distant station when either the theft head or the fire head is connected to the amplifier, means are provided for interrupting the circuit from the transformer through the split post switch 57 to the information circuit of the telephone system. Such interruption corresponds to that which may be effected in a conventional telephone system by dialing or may be accomplished by lifting the receiver to close the circuit and then actuating the button normally held down by the weight of the receiver to interrupt for an instant, and repeatedly at proper intervals, the information circuit of the telephone system to "dial" or call the distant station. This hand manipulation of the telephone properly carried out produces the same effect at the distant station as operation of the dialing device in the normal manner on a conventional telephone instrument.

The circuit to the "information line" from the transformer 59, in the apparatus of the invention as disclosed in Fig. 1, normally is closed by a continuous conductive layer 121, Fig. 2, carried on the tape 81 at the face of the tape in engagement with the split post switch 57, this conductive layer on the moving tape bridging across the two conductive segments 115, 116 which are separated by an insulating plate 117 in the split post switch 57. Thus, normally this circuit is completed to transmit the message, as above described. In order to accomplish the calling of the distant station through this same circuit in the manner just referred to, equivalent to dialing on the telephone system, the tape 81 in the embodiment being described, as shown in Fig. 2, is provided with a plurality of narrow non-conductive or insulating elements 123 extending transversely of the length of the tape and applied to the face of the conductive strip. These transverse insulation elements as individual elements and as groups of elements are spaced apart length-wise of the tape and are of such width, having regard to the speed of the tape and the time factor in the dialing operation of the telephone system, that the circuit is interrupted at the split post switch 57 for the proper interval and these intervals are properly spaced to produce the dialing of the desired distant station. The number of such switch actuating elements in each group is the same as that of the digit at the respective positions on the dial of the telephone instrument at which the call letters and numbers are positioned.

Accordingly, as shown in Fig. 2, if the number of the distant station to be called is DI–4–2172, for example, the letters D and I, respectively at the third and fourth position on the conventional telephone dial, will require three and four of the transverse elements. The spacing of these elements in the respective groups D and I, having regard to the speed of the tape, will be such as to correspond to the timing of the click in the telephone dialing device and the spacing of the two groups may be such as to correspond to the time required for the dialer again to start operation for dialing the letter I after completion of the dialing of the letter D. Similarly, having regard to the disposition of the numerals on the dial in their respective successive numerical positions, the number of transverse elements in the groups corresponds to the numerals respectively 4, 2, 1, 7 and 2. The spacing of these groups also is such as to correspond to the time between the completion of the dialing of the letter or numeral and the starting of the next letter or numeral, that is to say, the time for the dialing disc carrying the finger opening in the conventional telephone instrument to return to its initial position.

It now will be apparent, as the tape 81 moves toward the left at the top stretch thereof in Fig. 2 and over the split post switch 57, that in the first group the three transverse elements 123 in succession will bridge across the conductive segments 115 and 116 of the split post 57 that are separated by the insulating layer 117 to open the circuit through this switch above described to the contacts of the plug 65 and the jack 67. With continued movement of the tape the successive groups of transverse elements 123 effect the interruption of the circuit at split post 57 to accomplish the opening of the information circuit in the manner above mentioned to accomplish dialing as in a conventional system. When the whole series of transverse elements 123, seven groups of these elements suitably spaced apart along the tape being utilized in the embodiment being described, has passed over the switch 57, the circuit is again closed by bridging contact of the conductive layer 121. The message then may be transmitted to this circuit in the manner above described by energization of the theft or fire head, as the case may be, by the corresponding magnetic track of the tape.

By providing on the respective tracks a plurality of recordings of the message in series lengthwise of the tape, the appropriate message may be repeatedly transmitted so that it may be heard immediately and repeatedly when the distant station answers and listens to the call. The repetition of the message, for example, may be carried on the successive loops of tape passing over the idler posts or rolls 93, as shown in Fig. 1*b*. Since the circuit is now closed to the information circuit of the telephone system by the bridging of the conductive segments 115, 116, and since the relays 15, 29 remain energized, the message will be transmitted continuously and repeatedly unless the relays 15, 29 are de-energized, which may be accomplished by actuating the reset switch 112 to open the circuits through the anode-cathode of the triodes, or by unlocking the lock to open the lock actuated switch 125, Fig. 1*a*, to cut the main power supply, this lock actuated switch being mounted on an entrance door or other suitable closure for a door or window leading to the space in which the apparatus is disposed for detecting theft or fire. It will be understood that when the distant station, such as the police or fire station, or both, answers, for example, by lifting a telephone receiver at such distant station and hears the transmitted message, the alarm will be given so that proper action may be taken to visit the site and apprehend the intruder or take the necessary steps for dealing with fire producing smoke.

In a practical embodiment, the duration of the dialing portion of the cycle may be, for example, 20 seconds. The message which itself might require 15 seconds for a single transmission might be repeated in a tape of suitable length, say 4 times. Such a practical embodiment would require a tape of about 300 inches in length running at 3¾ inches per second. By suitably arranging the loops and the idlers 93, this length of tape may be disposed in a relatively small space while at the same time allowing a suitable diameter for the capstan and space for the driving motor. Such a capstan may have a diameter, for example, of about one inch. The diameter of the split post switch and of the idler posts or rollers may be, for example, ½ inch. These dimensions correspond to tape which, for example, may be ¼" to ⅜" wide, the tracks being $\frac{1}{10}$" to ⅛" wide and disposed along the edges of the tape with a narrow space therebetween.

Trailing the portion of the tape carrying recorded messages but at the face thereof opposite to that disposed toward the fire and theft heads and covering a portion of the continuous conductive layer 121 is a layer of insulting material 127 which is of substantial length along the tape as shown in Fig. 1*b* and Fig. 2. As this insulating layer 127 moving in the upper horizontal stretch toward the left in these figures reaches the split post switch 57 and bridges the segments 115, 116, it opens the circuit to the information line in the telephone system for a sufficient length of time, while the tape continues to move, so that "hanging up" is effected in the same manner as if the receiver at a calling station were replaced in position resting on buttons of the conventional telephone instrument. The means provided at the distant receiving or called station, therefore, become effective to disconnect the called station and to restore the system to the condition in which the "dialing" action again may be effective to call the distant station, i.e., the police or the fire station.

Since, as above stated, the motor 85 will continue to operate whether or not the cause is removed which initiated the cycle, it will be apparent that, after a short period of time represented by the distance along the tape by which the dialing section now trails the insulating layer 127, "dialing" again will be effected by the transverse elements 123 in the manner above described. Thereafter, the message determined by the operation of the particular triode 11 or 25, as the case may be, again will be transmitted by the corresponding head 45, 49 and repeated until the insulating layer 127 again reaches the split post switch 57 to effect "hanging up." This repetition of the cycle will continue until the site is visited and the reset switch 112 is operated or the lock actuated switch 125 is opened by the investigator.

It is desirable that the condition of the system of the invention be checked at intervals and it is a feature of the invention that this may be accomplished in the manner about to be described from the supervising station, that is, the police or the fire station, through the telephone system. To this end, the relay coil 75, as above mentioned, is connected across the ringing circuit of the telephone system brought into the "station" at which the alarm device of the invention is installed, this ringing circuit being connected to the contacts 69, 71 of the jack 67, the relay 75 being connected to this ringing circuit upon insertion of the plug 65.

The relay 75, when energized by the current flowing through the ringing circuit which may be initiated by the police or the fire station calling the "station" at which the device of the invention is installed, opens the contact 131 normally closed against the back contact 133 connecting the bias terminal 134 of the direct current power supply 17 to the grid 135 of a "check" triode 137. The circuit through the anode 139 and cathode 141 of the triode 137 is established from a terminal of the direct current power supply 17 through the reset switch 112 and the normally closed contact elements of a thermal time delay relay 143, and thence through the heating element 145 of this relay and through a series resistance 147 to the other terminal of the direct current power supply 17. It will be understood that as long as the bias potential is maintained at the grid 135 by the closed contacts 131, 133 the circuit through the anode-cathode remains open and the heating element 145 is not heated by current flow. When, however, upon energization of the relay 75, the contact 131 opens the circuit through the contact 133 to the grid 135 and thus removes the bias at this grid to "fire" the triode 137, the current flows through the thermal relay and its heating element 145 and through the anode-cathode circuit of the triode 137. The heating element 145 of the relay then is heated to effect operation of the relay 143 to open this circuit after a given time delay.

Upon energization of the relay 75 contact 151 also is moved from the back contact 153 which is connected in a circuit from the power supply 111 to the voltage regulator 2 to the output terminals of which the light source 1 is connected. Such interruption of the circuit to the voltage regulator and to the light source produces the same effect as the interruption of the beam in the space 3 by the presence of an intruder, so that the potential is removed from the grids 9, 27 of the triodes 11, 25, the motor 85 is started and movement of the tape 81 is effected in the manner above described. Since the tape in its previous operation will have been stopped in the manner to be described when the insulating layer 127 engages the "homing" switch 91, the "check" section of the tape may be disposed in position so that it may pass over the split post switch 57 almost immediately after the tape is started.

As shown in Fig. 1, the segments 115, 116 of the switch 57 are bridged by the conductive layer 121 carried by this tape at the opposite side thereof from the "check" section. As above described, the circuit will be established to the information circuit through switch 57 and the message carried by the "check" section of the tape indicating "all is in order" will be transmitted through the information circuit to the supervising station which in the checking operation is calling the "station" at which the device of the invention is installed. Preferably, this message is carried on the same track as that which carries the theft message because, upon complete interruption of the beam from the light source which is accomplished by opening the circuit to the voltage regulator 2 in the manner just mentioned, the circuit is established through the theft head 45. The "check" message, therefore, which it will be noted precedes the "dialing" section along the tape in the direction of movement of the tape and reaches the split switch 57 before this "dialing" section, will be delivered to the distant calling station, the supervisor being already on the line.

If, having regard to the speed of the tape, the "check" message requires 20 seconds for its delivery and if the thermal relay 143 is constructed to open the circuit at its contacts upon heating of the thermal element 145 immediately after this 20-second period, then the power supplied to all of the triodes will be cut off at the completion of the check message and the relays 15, 29 will be de-energized. The motor 85, however, will continue to run, being energized in the manner to be described, until the tape again reaches the position shown in Fig. 1. Although the "dialing" section will have passed over the split post switch 57 the dialing signals will not be transmitted to the distant station, that is, the police or the fire station, because the de-energized relay 29 has opened contacts 55, 56. The theft and fire messages likewise will not be transmitted to the listening supervisor. The system thus becomes reset for a subsequent operation initiated by the presence of an intruder or the occurrence of fire or smoke in the space 3. It will be understood in this connection that when the current is cut off from the heating element 145 in this manner, the contacts of the relay 143 will return to the closed position.

If the theft triode 11 is out of order, its relay will not be energized to connect the theft head 45 in circuit with the amplifier through the contacts 41. No "check" message, therefore, will be heard on the line in the checking operation by the distant supervising station. Correspondingly, if the fire triode 25 is out of order its relay 29 will not be energized to close contacts 107, 109 to start the motor 85 and no "check" message will be heard on the line by the supervisor at the distant station. These characteristics of the check system of the invention and others will make it possible to determine whether or not the apparatus of the invention placed in the space 3 to be supervised is in operating order so that suitable investigation may be made, if necessary.

It will be understood that, when the supervisor has hung up after calling, the relay 75 will be deenergized, contacts 131, 133 will be closed and the contacts 151, 153 also will be closed to re-establish the circuit from the bias terminal 134 of the direct current power supply 17 to the grid 135 of the check triode 137 and to re-establish the circuit from the supply 111 to the voltage regulator 2 and the light source 1, so that the apparatus of the invention will be in order for operation in case of entry of an intruder or the occurrence of fire.

As above mentioned and as shown in Fig. 1*b*, the insulating layer 127, described above more particularly in connection with Fig. 2 and its cooperation with the split post switch 57 to effect "hanging up," also is utilized in the manner now to be described to stop movement of the tape in a more or less predetermined relation of the message recordings on the tracks to the split post switch 57 and to the theft and fire heads 45, 49. The requisite position of the "check" message which is carried on the theft track, as above mentioned, also is determined in relation to the split post switch 57. As shown, the interval of length between the split post switch 57 and the forward end of the "dialing" section is occupied by the "check" section on the side of the tape which carries the tracks while on the reverse side the conductive layer 121 bridges the segments 115, 116 of the switch 57 for this interval. This interval is of sufficient length to correspond to the time interval, for example, 20 seconds, required in the conventional telephone system to develop the "dial tone" which must occur before the dialing operation may proceed.

Whenever the circuit from the power source 111 through the contacts 107, 109 is interrupted, upon operation of the reset switch 112 or the lock switch 125 or upon operation of the thermal relay 143 of the "check" system, the motor 85, nevertheless, will continue to run because the circuit thereto is completed through contact 161 closed against contact 163 of a relay 165 energized through an auxiliary source or battery 167 upon closing the circuit at the "homing" switch 91 when the conductive layer 121 bridges the segments 92 of this "homing" switch. The motor 85 will continue to operate until the insulating layer 127 passes over the "homing" switch 91 and bridges the segments 92 thereof, thus interrupting the circuit through the battery 167 and de-energizing the relay 165 to open the contacts 161, 163. Since the contacts 107, 109 previously have been opened, the motor will come to a stop. The thickness of the insulating layer 180 between the segments 92 is somewhat greater than the width of the individual transverse elements 123, so that these individual transverse elements do not bridge across the segments 92 of the switch 91.

The length of the layer 127 may be such, having regard to the inertia of the rotating parts of the motor and of the capstan and tape driven thereby, that the motor will stop while the layer 127 still bridges the segments 92 to maintain the circuit to the motor open. Although the length of the layer 127 along the tape is sufficient for this purpose, the length of this layer is so limited and its disposition along the tape from the leading end of the "check" message section is such that the "check" section will be stopped in such position that the conductive layer 121 at the opposite face of the tape from the "check" section will continue to bridge the segments 115, 116 of the split post switch 57 to provide the interval for developing the "dial" tone before the "dialing" section reaches the split post switch 57 and to provide, however, for passing the "check" section beneath the theft head to transmit the "check" message through the theft head whenever the supervising station calls and relay 75 is energized with the resulting operation of the "check" system of the invention in the manner above described. It will be understood, although the circuit to the motor is open both at the contacts 107, 109 and at the contacts 161, 163 when the apparatus is at rest, that this circuit may be closed at any time through the contacts 107, 109 upon complete interruption of the beam from the light source 1 or upon reduction of the radiant energy thereof, as above described.

Figure 1B:
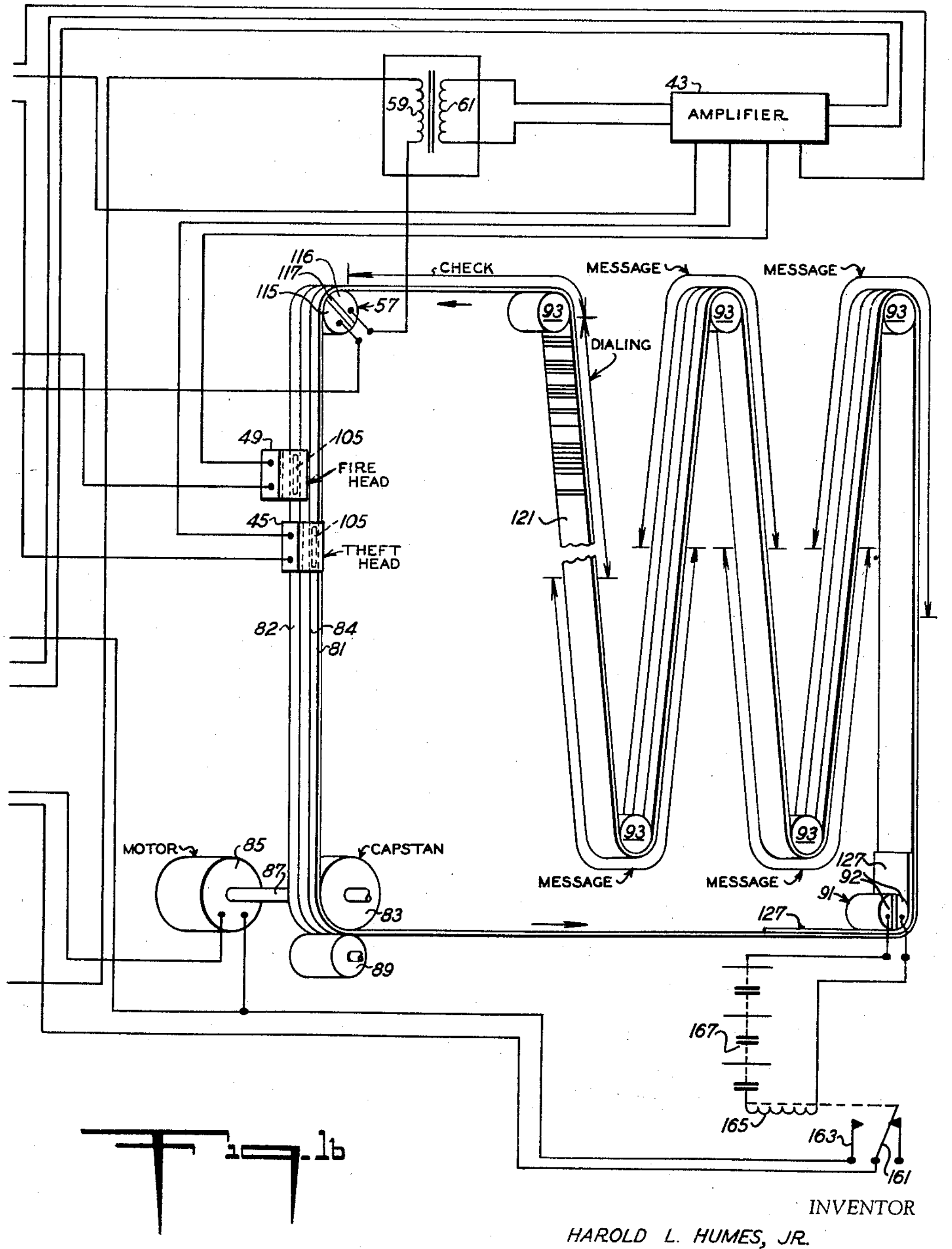

As shown in Fig. 1*a*, a low voltage relay 171 is connected across the A.C. supply 111. This relay is energized as long as the power supply voltage is maintained to hold the contacts 173 open against front contacts. Upon de-energization of the relay 171 upon power failure, the contacts 173 are closed against the back contacts 175 to connect a battery vibrator auxiliary alternating supply 177 to the leads which are connected from the power supply 111 to the direct current supply device 117, to the motor circuit and to the voltage regulator circuit which have been referred to above. This battery vibrator auxiliary supply, therefore, will maintain the requisite potentials at the various devices of the apparatus of the invention in the event of such power failure, so that the apparatus may be effective to operate in the event that an intruder enters the space 3 or a fire or smoke occurs in this space.

The resetting of the system accomplished by operating the reset button 112 or by operating the lock switch 125, as above described, also may be accomplished by calling from the remote supervising station in the same manner as described in connection with the "checking" operation, this calling, however, being effected during an interval when the device has "hung up" in the telephone line, that is, after insulating layer 127 has passed the split post switch 57 and before the "dialing" section on the tape next reaches this switch, so as to fire the "check" triode 137 to open the thermal relay 143, as previously described, and thereby to open the circuit from the direct current power supply 17 to the triodes.

Within the scope of the invention, instead of a single photo-electric cell to which the grids 9, 27 of the triodes 11, 25 are connected in parallel, two photo-electric cells may be utilized respectively connected to the grids 9, 27 but energized in common by the beam from the light source 1. The system controlled by these two triodes for transmitting the signals to the receptor means in the manner described hereinabove in such a modification may be the same as disclosed in connection with Figs. 1 and 2. Such a dual cell arrangement may be provided by a device in which two photo-sensitive elements are disposed in a single envelope, these elements being subjected to the beam from the light source 1 and connected respectively to the grids 9, 27.

Instead of the tape construction shown in the drawings and described above, a tape of material which is both magnetic and conductive, such as a steel tape, may be used to carry the messages as well as to carry the transverse elements 123 and the insulating layer 127 for effecting the "dialing." It will be understood that such a tape will operate the theft and fire heads as well as the split post switches in the manner which has been described in connection with the tape 81.

If desired, two or more sets of the transverse insulating elements 123 may be arranged in parallel on the face of the conductive layer 121, each of these sets extending lengthwise of the tape as does the set of elements shown in Fig. 1*b* and Fig. 2 of the drawings. Each set thus may provide for calling a different remote station, a split spost switch similar to switch 57 being provided for each set of transverse elements 123 to cooperate therewith in the manner described for "dialing" the respective stations. Thus, it will be apparent that the occurrence of theft or fire may be transmitted respectively to the police station and the fire department, for example, or to other separate supervising stations.

Other variations may be made within the skill of the art while maintaining the features of the invention as above described and as defined in the appended claims.

We claim:

1. A communications system comprising a member movable in a predetermined path of movement, said member carrying means providing a plurality of recordings in tracks movable lengthwise of said tracks generally parallel to said predetermined path of movement of said member, a plurality of pick-up devices respectively disposed adjacent said tracks of said member for movement of said tracks lengthwise thereof with respect to said pick-up devices upon said movement of said member, said track means respectively being capable of energizing said pick-up- devices upon said movement of said member, means operatively connected to said pick-up devices for producing respective signals in response to energization of the respective pick-up devices, receptor means capable of producing indications respectively corresponding to said signals produced by said signal producing means, means operatively connecting said signal producing means to said receptor means for respectively producing said indications upon energization of the respective pick-up devices, a source radiating in a beam a given amount of radiant energy, and means responsive to two predetermined different amounts of the radiant energy of said beam less than said given amount and operatively connected to said pick-up devices for controlling the producing of the respective signals by said signal producing means upon energization of said pick-up devices in response respectively to said different predetermined amounts of radiant energy in said radiant energy beam.

2. A communications system as defined in claim 1 in which said member provides two generally parallel faces at opposite sides thereof, said plurality of track means being carried upon a given face of said member, a plurality of switch actuating elements carried by said member upon the opposite face thereof, said elements being spaced with respect to each other in the direction generally parallel to the lengthwise extent of said tracks, a switching device disposed adjacent said opposite face of said movable member for movement of said member relative to said switching device in said movement of said member lengthwise of said tracks, said switch actuating elements being moved in succession into register with said switching device for intermittently actuating said switching device, and means capable of producing a calling signal operatively connected to said switching device for producing said calling signal upon actuation of said switching device by said switch actuating elements, said elements being disposed on said member in a predetermined relation to said track means to produce said calling signal in a predetermined relation to said signals transmitted from said pick-up devices.

3. A device for recording information and controlling the transmission thereof which comprises a tape adapted to be supported for movement thereof lengthwise of said tape relative to a pick-up device disposed adjacent a given face of said tape, means carried on said given face of said tape and providing a track extending lengthwise of said tape carrying said recording, said track means being capable of energizing said pick-up device upon said movement of said tape relative to said pick-up device for effecting the transmission of said information by said pick-up device, said tape carrying at a selected face thereof a conductive band having a continuous extent along said tape throughout a predetermined length of said track along said tape, said band providing an exposed surface for contact with conductive contacts of an electrical switching device disposed adjacent said conductive band for bridging said conductive contacts as said tape moves lengthwise thereof so as to close a circuit connected to said contacts, and a nonconductive element carried by said tape and covering said band at said exposed face thereof at a predetermined point in the length of said band in relation to said predetermined length of said track means for insulating said conductive band from said conductive contacts of said switching device to open said circuit.

4. A two-way intelligence transmitting system comprising detecting means responsive to a plurality of different predetermined conditions, a plurality of control means connected to said detecting means and actuated by said detecting means in accordance with the respective predetermined conditions, a member movable in a predetermined path of movement, means carried by said member and providing message recordings in a plurality of tracks extending generally parallel to said predetermined path of movement of said member, pick-up devices respectively disposed adjacent said tracks of said member for movement of said tracks lengthwise thereof with respect to said pick-up devices upon said movement of said member, said track means being capable of energizing the respective pick-up devices upon said movement of said member, means operatively connected to said pick-up devices and responsive to energizing of said pickup devices for producing message signals respectively corresponding to said recordings in said tracks and operatively connected to said control means for transmitting said message signals in a given direction in said system upon operation of said detecting means respectively in response to said plurality of conditions, driving means for effecting said movement of said member along said path, means responsive to a signal transmitted in the reverse direction in said system and operatively connected to a given control means and to said driving means for effecting operation of said given control means and operation of said driving means to effect said movement of said member along said path, said means responsive to said reverse signal being operatively connected to another of said control means and the pick-up device connected thereto for transmitting a signal in said given direction in said system upon energization of said other pick-up device, said track means associated with said other pick-up device providing a check section disposed on said member in advance of a message section in the direction of movement of said member and energizing said other pick-up device to provide a check signal in said given direction in said system indicating the condition of operativeness of said system upon operation of said means responsive to said reverse signal.

5. A two-way intelligence transmitting system comprising a member movable in a predetermined path of movement, means carried by said member and providing recordings in a plurality of tracks extending lengthwise of and generally parallel to said predetermined path of movement of said member, pick-up devices respectively disposed adjacent said tracks of said member for movement of said tracks lengthwise thereof with respect to said pick-up devices upon said movement of said member, said track means being capable of energizing said pick-up devices upon said movement of said member, means operatively connected to said pick-up devices and responsive to energization of said pick-up devices for producing message signals respectively corresponding to said recordings in said track means and for transmitting said message signals in a given direction in said system, detecting means responsive to a plurality of different predetermined conditions and operatively connected to said pick-up devices and to said signal transmitting means for transmitting said message signals from said pick-up devices in said given direction in said system upon operation of said detecting means respectively in response to said different conditions, driving means for effecting movement of said member along said path in a predetermined direction, means responsive to a signal transmitted in the reverse direction in said system and operatively connected to a given detecting means and to said driving means for effecting operation of said given detecting means and said driving means and movement of said member in said predetermined direction, said means responsive to said reverse signal being operatively connected to another of said detecting means and the pick-up device connected thereto for transmitting a signal in said given direction in said system upon said movement of said member effecting energization of said other pick-up device, said track means associated with said other pick-up device providing a check section and a message section, said check section being disposed in advance of said message section in said predetermined direction of movement of said member and energizing said other pick-up device to provide in said given direction in said system a check signal indicating the condition of operativeness of said system upon operation of said means responsive to said reverse signal.

6. A two-way intelligence transmitting system defined in claim 5 which comprises means connected to and operable upon operation of said reverse signal responsive means for making said check signal means inoperative upon completion of said check message and prior to energization of said other pick-up device by said message section.

7. A communications system comprising means providing a source radiating in a beam a given amount of radiant energy, detecting means responsive to two predetermined different amounts of radiant energy of said beam less than said given amount and producing electrical potentials corresponding to said two amounts of radiant energy of the beam, a plurality of triodes respectively having grids connected in parallel to said detecting means to impress said potentials on said grids, a plurality of relays respectively connected in series with the anode-cathode circuits of said triodes, means connected to said anode-cathode circuits of said triodes to determine in the respective triodes different anode-cathode potential differences for firing said triodes at different potentials of said grid corresponding to said different amounts of radiant energy in said beam, receptor means responsive to signals transmitted thereto for producing indications corresponding to said signals, contacts respectively actuated by said relays, a plurality of signal pick-up devices respectively capable when energized of producing electrical potentials and respectively connected in circuit with said relay contacts, a member movable in a predetermined relation to said pick-up device and carrying means providing a plurality of recordings in tracks movable lengthwise of said tracks relative to said pick-up devices, said track means respectively being capable of energizing said pick-up devices upon said movement of said member, said recordings on said member representing a plurality of conditions corresponding respectively to said different amounts of radiant energy in said beam, said pick-up devices being operatively connected to said receptor means for transmitting to said receptor means respective signals upon energization of the respective pick-up devices upon said movement of said member, said receptor means being responsive also to a calling signal, a switching device disposed adjacent said movable member for movement of said member relative to said switching device, said member carrying switch actuating elements in spaced relation lengthwise of said tracks upon said member and moved into register with said switching device intermittently to actuate said switching device concomitantly with said movement of said member, said switching device being operatively connected to said receptor means for operating said receptor means to produce said calling signal, said switch actuating elements being disposed on said member in a predetermined relation to said recording tracks to determine the sequence of said calling signal and said signals transmitted from said pick-up devices.

8. A communications system as defined in claim 7 in which said member comprises a tape supported for movement thereof lengthwise of said tape to move said tracks lengthwise thereof in relation to the respective pick-up devices, said tape carrying said track means on one face thereof and carrying on the opposite face thereof said switching elements, said switching device being disposed adjacent said face carrying said switch actuating elements for registering of said elements with said switching device upon movement of said tape lengthwise thereof.

9. A communications system comprising means providing a source radiating in a beam a given amount of radiant energy, a detecting means responsive to two predetermined different amounts of the radiant energy of said beam less than said given amount and producing electrical potentials corresponding to said two amounts of radiant energy of said beam, a plurality of control means connected in parallel to said detecting means and responsive respectively to the different potentials produced by said detecting means corresponding respectively to different amounts of radiant energy in said beam, signal transmitting means connected to said control means and responsive respectively to said control means to transmit different signals corresponding to said amounts of radiant energy of said beam, receptor means operatively connected to said transmitting means and responsive to the signals transmitted by said transmitting means for producing in said receptor means signals respectively corresponding to said different amounts of radiant energy in said beam, said control means each providing a construction capable upon actuation thereof in response to said respective potentials of becoming conditioned to prevent further response to change in said respective potentials, means responsive to a signal transmitted thereto, and a control device operatively connected to said signal responsive means and operatively connected to said plurality of control means for actuating said control means to develop said condition preventing said control means from being further responsive to change in said respective potentials produced by said detecting means.

10. A communications system comprising means providing a source radiating in a beam a given amount of radiant energy, a detecting means responsive to two predetermined different amounts of the radiant energy of said beam less than said given amount and producing electrical potentials corresponding to said two amounts of radiant energy of said mean, a plurality of triodes respectively having grids connected in parallel to said detecting means to impress said potentials on said grids, a plurality of relays respectively connected in series with the anode-cathode circuits of said triodes, means connected to said anode-cathode circuits of said triodes to determine in the respective triodes different anode-cathode potential differences for firing said triodes at different potentials of said grid corresponding to said different amounts of radiant energy in said beam, receptor means responsive to signals transmitted thereto for producing indications corresponding to said signals, means operatively connecting said relays to said receptor means for delivering to said receptor means signals respectively determined by said different firing potentials of said triodes and corresponding to said different amounts of radiant energy of said beam, means responsive to a signal transmitted thereto, and a control device operatively connected to said signal responsive means and connected to the anode-cathode circuits of said triodes for interrupting said circuits in response to said signal.

11. A communications system comprising means providing a source radiating in a beam a given amount of radiant energy, a detecting means responsive to two predetermined different amounts of the radiant energy of said beam less than said given amount and producing electrical potentials corresponding to said two amounts of radiant energy of said beam, a plurality of control means connected in parallel to said detecting means and responsive respectively to the different potentials produced by said detecting means corresponding respectively to different amounts of radiant energy in said beam, signal transmitting means connected to said control means and responsive respectively to said control means to transmit different signals corresponding to said amounts of radiant energy of said beam, receptor means operatively connected to said transmitting means and responsive to the signals transmitted by said transmitting means for producing in said receptor means signals respectively corresponding to said different amounts of radiant energy in said beam, means responsive to a signal transmitted thereto, and means operatively connected to said signal responsive means and to said means providing said source of radiant energy for interrupting operation of said source means to interrupt said radiant energy in response to said signal.

References Cited in the file of this patent

UNITED STATES PATENTS

| | | |
|---|---|---|
| 2,199,394 | Dewan | May 7, 1940 |
| 2,204,225 | Mercel | June 11, 1940 |
| 2,318,591 | Couffignal | May 11, 1943 |
| 2,523,761 | Hickey | Sept. 26, 1950 |
| 2,547,838 | Russell | Apr. 3, 1951 |
| 2,640,975 | Roe | June 2, 1953 |
| 2,656,497 | Schweighofer | Oct. 20, 1953 |
| 2,763,853 | Grant | Sept. 18, 1956 |
| 2,793,807 | Yaeger | May 28, 1957 |

FOREIGN PATENTS

| | | |
|---|---|---|
| 727,162 | Great Britain | July 18, 1951 |